(12) United States Patent
Moskowitz et al.

(10) Patent No.: US 7,313,250 B2
(45) Date of Patent: Dec. 25, 2007

(54) METHOD AND SYSTEM FOR FREQUENCY DOMAIN WATERMARKING USING A PHASE BASED FILTER SIGNATURE

(75) Inventors: Ira S. Moskowitz, Washington, DC (US); Farid Ahmed, College Park, MD (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 618 days.

(21) Appl. No.: 10/817,404

(22) Filed: Mar. 31, 2004

(65) Prior Publication Data

US 2005/0226460 A1 Oct. 13, 2005

(51) Int. Cl.
*G06K 9/00* (2006.01)
(52) U.S. Cl. .................. 382/100; 382/280; 708/403
(58) Field of Classification Search ............. 382/100, 382/154, 168, 232, 233, 235, 237, 243, 250, 382/254, 260, 274, 276, 280, 305, 321, 115; 702/191; 360/77.04; 380/201, 232; 708/403
See application file for complete search history.

(56) References Cited

U.S. PATENT DOCUMENTS

| | | | | |
|---|---|---|---|---|
| 5,710,834 A | * | 1/1998 | Rhoads | 382/232 |
| 5,748,763 A | * | 5/1998 | Rhoads | 382/115 |
| 5,933,798 A | * | 8/1999 | Linnartz | 702/191 |
| 6,678,392 B2 | * | 1/2004 | Powell et al. | 382/100 |
| 6,952,321 B1 | * | 10/2005 | Lim et al. | 360/77.04 |
| 6,973,198 B2 | * | 12/2005 | Patton et al. | 382/100 |

\* cited by examiner

*Primary Examiner*—Seyed Azarian
(74) *Attorney, Agent, or Firm*—Thomas D. Robbins; John L. Karasek

(57) ABSTRACT

The present invention is a digital watermarking technique Phasemark™ for image authentication. Using a signature extracted from the original image, the present invention hides an encoded version of the signature back into the original image, forming the watermarked image. The hiding is done in the frequency domain. Specifically, the present invention is a new transform domain digital watermarking technique that hides a signature obtained from the Fourier phases into the magnitude spectrum of the same host image. The detection process computes the discrete Fourier transform of the watermarked image, extracts and decodes the embedded signature, and then correlates it with calculated phase information. Correlation metrics determine the degree of authenticity of the image.

11 Claims, 7 Drawing Sheets

| Y \ X | 0 | 1 | • • • | M-1 |
|---|---|---|---|---|
| 0 | s(0,0) | s(1,0) | | s(M-1,0) |
| 1 | s(0,1) | s(1,1) | | s(M-1,1) |
| ⋮ | ⋮ | ⋮ | ⋮ | ⋮ |
| N-1 | s(0,N-1) | s(1,N-1) | | s(M-1,N-1) |

*FIG. 2*

| v \ u | 0 | 1 | • • • | M-1 |
|---|---|---|---|---|
| 0 | F(0,0) | F(1,0) | | F(M-1,0) |
| 1 | F(0,1) | F(1,1) | | F(M-1,1) |
| ⋮ | ⋮ | ⋮ | ⋮ | ⋮ |
| N-1 | F(0,N-1) | F(1,N-1) | | F(M-1,N-1) |

*FIG. 3*

METHOD AND SYSTEM FOR FREQUENCY DOMAIN WATERMARKING USING A PHASE BASED FILTER SIGNATURE

BACKGROUND OF THE INVENTION

1. Field of the Invention

The present invention relates to the field of digital images, and more particularly to the field of watermarking digital images.

2. Description of Related Art

Watermarking has been in use for hundreds of years. Its earliest form was that of putting a physical impression into blank paper. Much later in the history of watermarking, the watermark was used as a way of authenticating a paper document, such as money, or other important legal documents [Ingemar Cox, Jeffrey Bloom, Matthew Miller, *Digital Watermarking: Principles & Practice*, 2001, Morgan Kauffman Publishers]. Our interest is in inserting a watermark into a digital image. This is a topic of recent interest. Due to the proliferation of electronic images on the Internet starting in the 1990s and the accompanying use of email, the owners or custodians of digital images wish to protect their intellectual property rights. Also, of interest is the ability to authenticate that a digital image is actually the digital image that one was intended to receive. The present invention relates to the field of authentication watermarks. The present invention is an authentication watermarking process of a digital image. Many of the existing watermarks of digital images are for proof of ownership. Authentication watermarks of digital images are an equally important area of watermarking.

A watermark is a semi-fragile watermark if it is robust to some degradation that might normally occur due to image processing (compression for example), while it is at the same time destroyed if the digital image is tampered with. Thus, an effective authentication watermarking method will work with JPEG images, which is a desired property. However, an authentication watermark should not be robust to gross image degradation due to tampering, which is also a desired property. Some watermarks are digital hashes of the digital image which are added onto the file. This is not a desired property because it changes and lengthens the original file format of the digital image.

In the area of Fourier optics, phase based filters, and in particular the binary phase only filter are used in image reconstruction [A. Oppenheim and J. Lim, "The importance of phase in signals," *Proc. IEEE*, vol. 69, pp. 529-541, May 1981] and correlation based pattern recognition applications [J. L. Horner and J. R. Leger, "Pattern Recognition with Binary Phase-only Filters," *Applied Optics*, Vol. 24, No. 5, pp. 609-611, 1985; David L. Flannery and Joseph L. Horner, "Fourier Optical Signal Processors", *Proc of the IEEE*, vol. 77, no. 10, 1989]. These filters are obtained by transforming the digital image from the spatial domain to the frequency domain via a discrete Fourier transform. Once in the frequency domain the transformed image is mathematically manipulated to obtain the phase based filters [D. Psaltis, E. Pack, and S. Venkatesh, "Optical Image correlation with binary spatial light modulator," *Opt. Eng.*, pp. 698-704, 1984; J. L. Horner and P. D. Gianino, "Phase-only matched Filtering," *Appl. Opt.*, vol. 23, pp. 812-816, 1984].

No existing watermarking method uses a Fourier optics based approach. This is a deficiency in the field of watermarking because Fourier optics allows one to modify the original image without gross changes to the phase of the image. Thus, Fourier optics allows an unobtrusive watermark to be added to an image. A watermark that modifies an image too much is not desirable. Also, the field of Fourier optics is well developed for the use of image processing. Since watermarking an image is an aspect of image processing, using a Fourier optics based watermark is a natural extension of Fourier optics.

SUMMARY OF THE INVENTION

The present invention is the first to use phase based filters, a part of Fourier optics, as the watermark in a watermarking process. The present invention uses a technique that has never been used before in the watermarking of digital images. The present invention uses a signature, obtained from a binary phase only filter of the image after it has been transformed from the spatial domain, via a discrete Fourier transform, into the frequency domain. The use of such phase only, and binary phase only filters, is used in the field of Fourier optics, but not for the purpose of watermarking. [J. L. Horner and P. D. Gianino, "Phase-only matched Filtering," *Appl. Opt.*, vol. 23, pp. 812-816, 1984, J. L. Horner and J. R. Leger, "Pattern Recognition with Binary Phase-only Filters," *Applied Optics*, Vol. 24, No. 5, pp. 609-611, 1985] Thus, the present invention is unique in using such a technique, and the present invention is an effective way of watermarking digital images for the purpose of authentication. In addition, the present invention allows for adding additional information into the watermark aside from authentication information. This additional information can be used to send extra information of a useful nature to the receiver of the watermarked image.

The aim of the present invention is to take an image file, given in any of the standard formats such as TIFF, JPEG, BMP, GIF, etc., and referred to as im.std, and to manipulate im.std, by the embedding of hidden information called the watermark via the embedding process of the present invention, into a new file called wm.std, so that the visual difference between im.std and wm.std, when they are viewed on a computer screen or printed out, is negligible, and also so that one can extract from wm.std the watermark. This watermark serves the purpose of authenticating wm.std as a legitimate image file from the originator of the file. The file may be sent through email, or posted on the web, or transferred in some other electronic manner.

The extraction process of the present invention may be performed on any image in a standard image file format, referred to as test.std. From test.std the extraction process produces a file called test.sig.

The present invention has a detection process which performs various mathematical correlation tests on test.sig to determine if test.sig is a valid watermark.

The embedding, extracting, and detection process of the present invention comprise the present invention and are designed so that the watermark will be detected for any compressionless image format, and for medium to high quality compression formats. This includes, but is not limited to medium to high quality JPEG image formats.

BRIEF DESCRIPTION OF THE DRAWINGS

FIG. 2: im.std (100) converted to its luminance Y values (101) as an indexed ensemble s(x,y), x=0, . . . , M−1 and y=0, . . . , N−1.

FIG. 3: The Fourier frequencies im.freq (102) as an indexed ensemble F(u,v), u=0, . . . , M−1 and v=0, . . . , N−1.

DESCRIPTION OF THE PREFERED EMBODIEMENTS

Embedding Process of the Present Invention:

The originating image file im.std (100) is converted to either its pixel luminance Y values if the originating image file is that of a greyscale image, or if it is a color image, it converts it to its luminance, red-chrominance, blue-chrominance YUV pixel values, and the Y value is extracted. This conversion is not part of the present invention and may be performed through various existing image viewing software packages, of the freeware, shareware, and licensed varieties.

Figure 1:
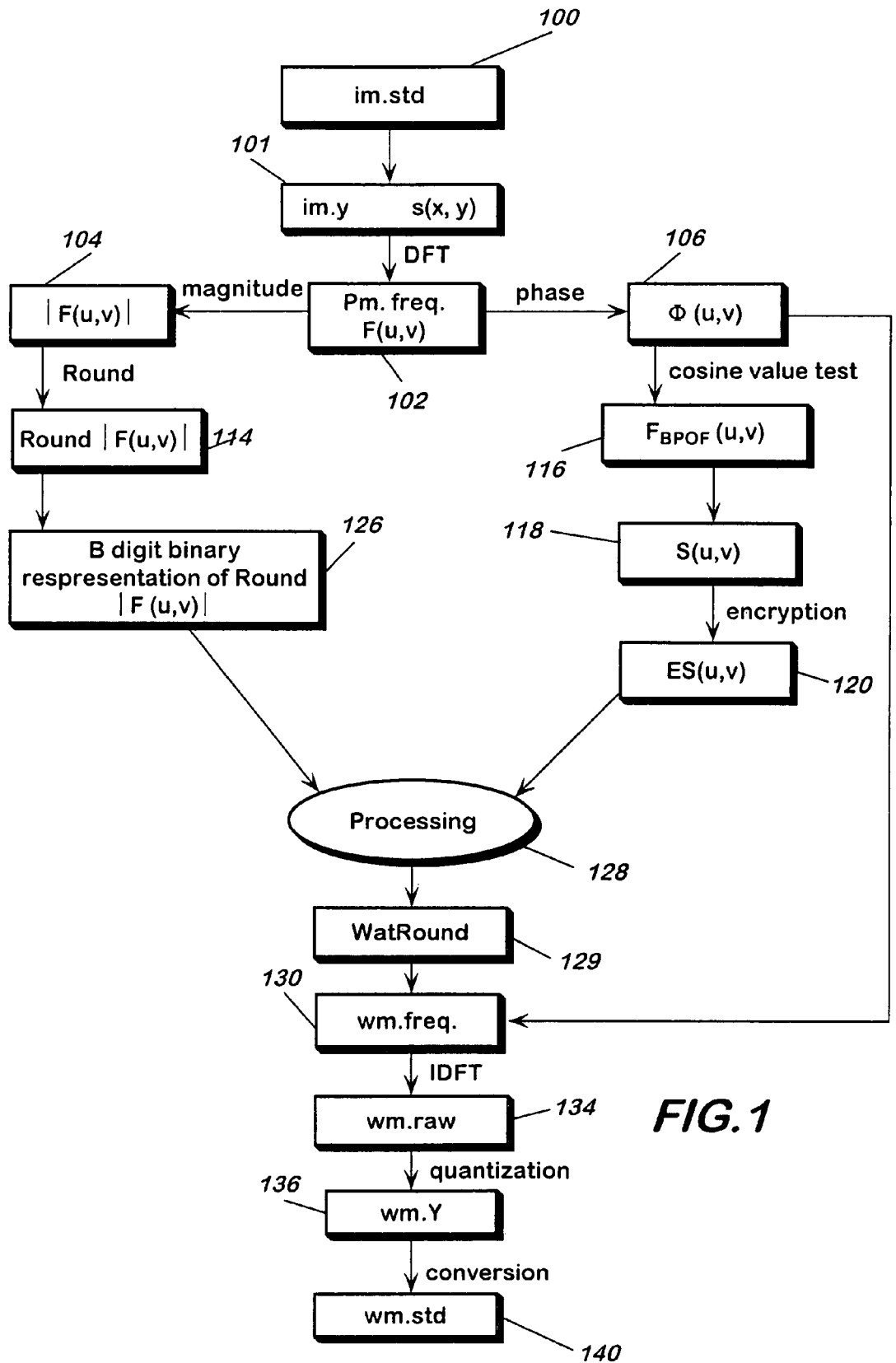
FIG. 1: The Watermark Embedding Process Flowchart

The present invention modifies only the luminance Y pixel values. Therefore, the present invention is designed to work for both greyscale and color images. However, alternate embodiments may modify other aspects of the original image. In order to better understand the merits of the present invention, let us look at the watermark embedding flowchart as depicted in FIG. 1. After im.std is converted to its Y values, which we denote by im.Y (101). This is the brightness value for every pixel in the image. The present invention applies a discrete Fourier transform, denoted by DFT, to im.Y. The discrete Fourier transform is well known in the art. This now gives a new file in the frequency domain which we denote by im.freq (102).

To address (101) more specifically: The original im.std (100) has pixel coordinates x from 0 to M−1, and y from 0 to N−1 as shown in FIG. 2. FIG. 2 shows how to index the pixel values as specific (x.y) coordinates. Therefore, every pixel is indexed by the tuplet (x,y). We denote the pixel Y value indexed by (x,y) as s(x,y). The indexed ensemble of the s(x,y) values is called the spatial representation of the image (101).

To address (102) more specifically: The frequencies, im.freq (102) has frequency coordinates u from 0 to M−1, and v from 0 to N−1 as shown in FIG. 2. FIG. 3 shows how to index the specific frequencies as (u,v) coordinates. Every frequency is indexed by a tuplet (u,v). We denote the frequency value indexed by (u,v) as F(u,v). The indexed ensemble of all the frequencies is considered the frequency representation of the image (102).

Each frequency F(u,v) is a complex number with magnitude |F(u,v)| and phase $\Phi(u,v)$. That is F(u,v)=|F(u,v)| exp (j·$\Phi$(u,v) ), where exp is the complex exponential function, and j is the principal valued square root of −1. We separate the frequencies of im.freq into their magnitudes |F(u,v)| (104) and their phases $\Phi$(u,v) (106).

The present invention applies a binary phase only filter to im.freq by transforming F(u,v) (102) to $F_{BPOF}$(u,v) (116) by using only the phase $\Phi$(u,v) (106) of F(u,v) (102). The present invention uses a cosine value test as shown in FIG. 1. This is done by defining:

$F_{BPOF}$(u,v)=1 if cos($\Phi$(u,v)) is non-negative, and $F_{BPOF}$(u,v)=−1 if cos($\Phi$(u,v)) is negative.

Alternate embodiments may use different binarization schemes.

The present invention assigns a pre-signature S(u,v) (118), which is a function of (u,v), to im.std (100) by defining:

S(u,v)=0, if $F_{BPOF}$(u,v)=−1, and S(u,v)=1, if $F_{BPOF}$(u,v)=1.

We adopt the terminology that a complex-valued function of (u,v), u from 0 to M−1, v from 0 to N−1, denoted as G(u,v) has a Hermetian type symmetry iff G(M-u,N-v)=G*(u,v), where * represents complex conjugation.

S(u,v) (118) has a Hermetian type symmetry, and since S(u,v) (118) is real-valued, we have that S(M-u,N-v)=S(u,v). The Hermetian type symmetry of S(u,v) (118)follows from the fact that the mathematical fact that the DFT of s(x,y) (101) into F(u,v) (102) gives give F(u,v) (102) a Hermetian type symmetry. The transformations of F(u,v) (102) to S(u,v) (118) preserve this Hermetian type symmetry.

The present invention encrypts S(u,v) (118) with a key based method of encryption that respects the Hermetian type symmetry, and also so that the encryption of S(u,v) (118), for a specific (u,v) value, is done independently of any other (u',v') value.

Figure 4:
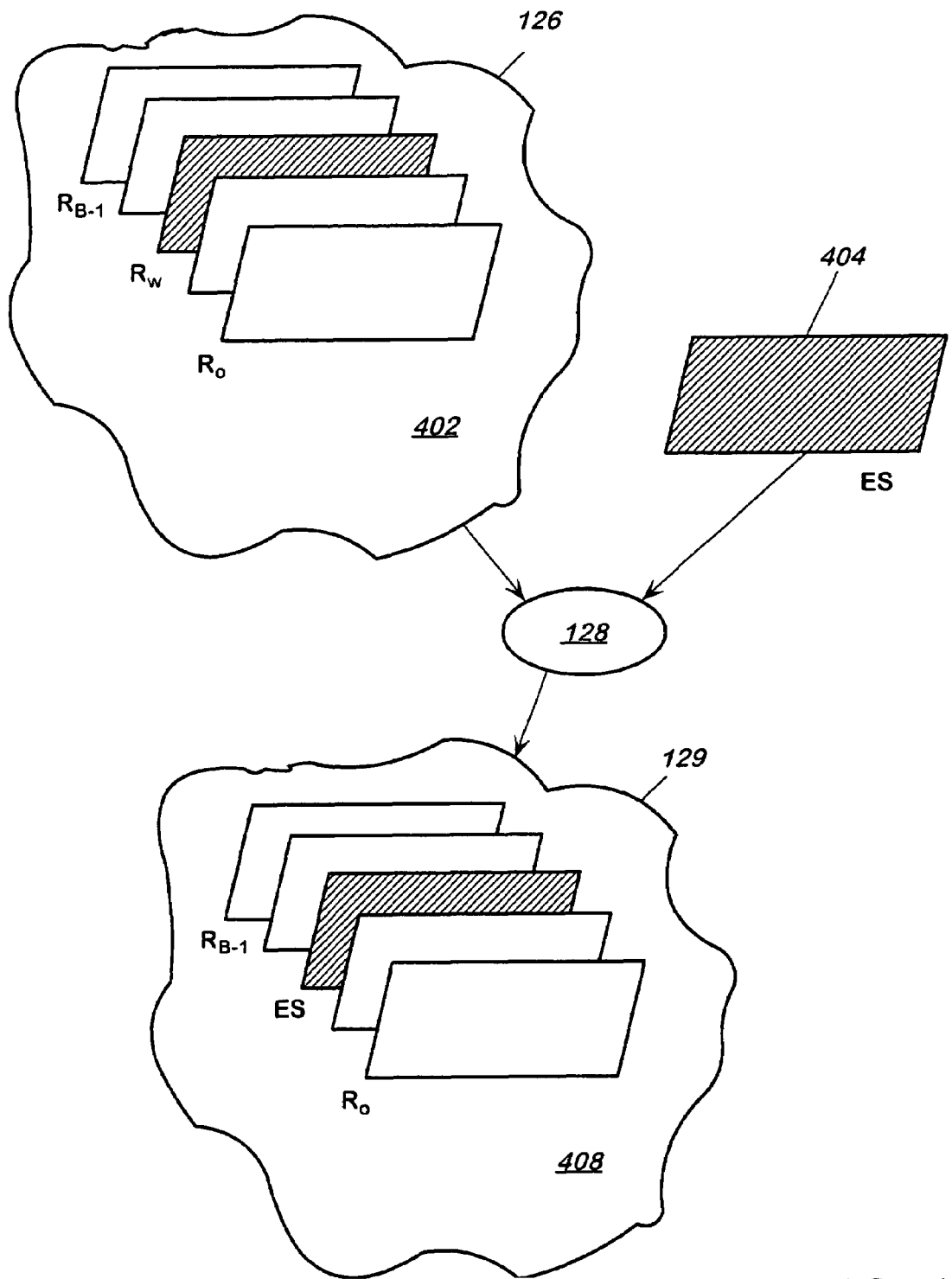
FIG. 4: Modification of the B-Digit Representation of the Rounded Magnitude

The former aspect of the encryption is to ensure that the encrypted versions of S(u,v) (118), denoted as ES(u,v) (120) has a Hermetian type symmetry. The later aspect of the encryption is to ensure that the encryption does not have the avalanche aspect of stream cipher cryptographic methods, this means that a small change in the input, should not cause a large change to the encrypted message. The present invention uses symmetric cryptography, hence there is a cryptographic key that is used for both the embedding and extracting of the watermark. Alternate embodiments may use public key cryptography. ES(u,v) (120) is named the signature (120) of im.std (100). When we refer to the entire M×N array of values ES(u,v) (120), we use the notation ES (404) as shown in FIG. 4.

For cryptographic reasons, the embodiment of the present invention uses a permutation based cipher that respects the Hermetian type symmetry for the cryptographic element. Such a cipher does not have the undesired avalanche effect. Alternate embodiments may use any cryptographic method that does not have the avalanche effect and respects the Hermetian type symmetry.

As illustrated in FIG. 1, the present invention converts the magnitudes |F(u,v)| (104) to integer values by rounding, the new values are denoted as Round|F(u,v)| (114). This can introduce a slight modification of the original image im.std (100), but the watermark detector takes this into account. The present invention stores the rounded magnitudes as B digit binary numbers (126), where B is chosen to be the smallest number so that the largest of the rounded magnitudes may be expressed as a B digit binary number. The present invention indexes with i, the digits of the binary number from i=0 to B−1, with 0 representing the "ones" place, and B−1 representing the $2^{B-1}$ place. The present invention uses a particular binary place w as a user controlled input. That is Round|F(u,v)|=$R_{B-1}$(u,v), . . . , $R_w$(u,v), . . . , $R_0$(u,v) is the binary representation of the integer rounded values of the frequency magnitudes. $R_i$(u,v) is either 0 or 1, and represents the value 0 or $2^i$, respectively. We use the notation $R_i$ (402) to refer to the M×N array of $R_i$(u,v) values as shown in FIG. 4.

In the actual embedding, the signature ES (404) can be combined with the Rounded Magnitude (402) using a generic invertible arithmetic/logic process (128). In one embodiment, the present invention replaces the $w^{th}$ place in Round|F(u,v)| with the encrypted signature (404). We denote this modified value (408) as WatRound|F(u,v)|(u,v)=$R_{B-1}$(u, v), ... $R_{w+1}$(u,v), ES(u,v), $R_{w-1}$(u,v), ..., $R_0$(u,v). The entire M×N array of such values is denoted as WatRound (129). Alternate embodiments may use different a different processing scheme (128).

Note that the present invention modifies the magnitude |F(u,v)|, because this modification does not change the phase Φ((u,v). This is a key step in the process.

The present invention forms a new frequency domain file wm.freq (130) by using WatRound (129) and the original phase Φ(u,v) (106) as follows: The (u,v) frequency values of wm.freq (130) is wm.freq(u,v)=WatRound|F(u,v)| exp(j·Φ(u,v)).

The present invention applies an inverse discrete Fourier transform (IDFT) to wm.freq (130), called wm.raw (134). The present invention quantizes wm.raw (134) to to integer values between 0 and 255 by rounding, clipping, and clamping, and arrives at a new Y values called wm.Y (136). The present invention then converts wm.Y (136) to the original image file format and calls this file wm.std (140). The present invention respects whether im.std (100) was greyscale or color and produces wm.std (140) in the correct format. The file wm.std (140) is considered the watermarked image and is what is distributed.

Figure 5:
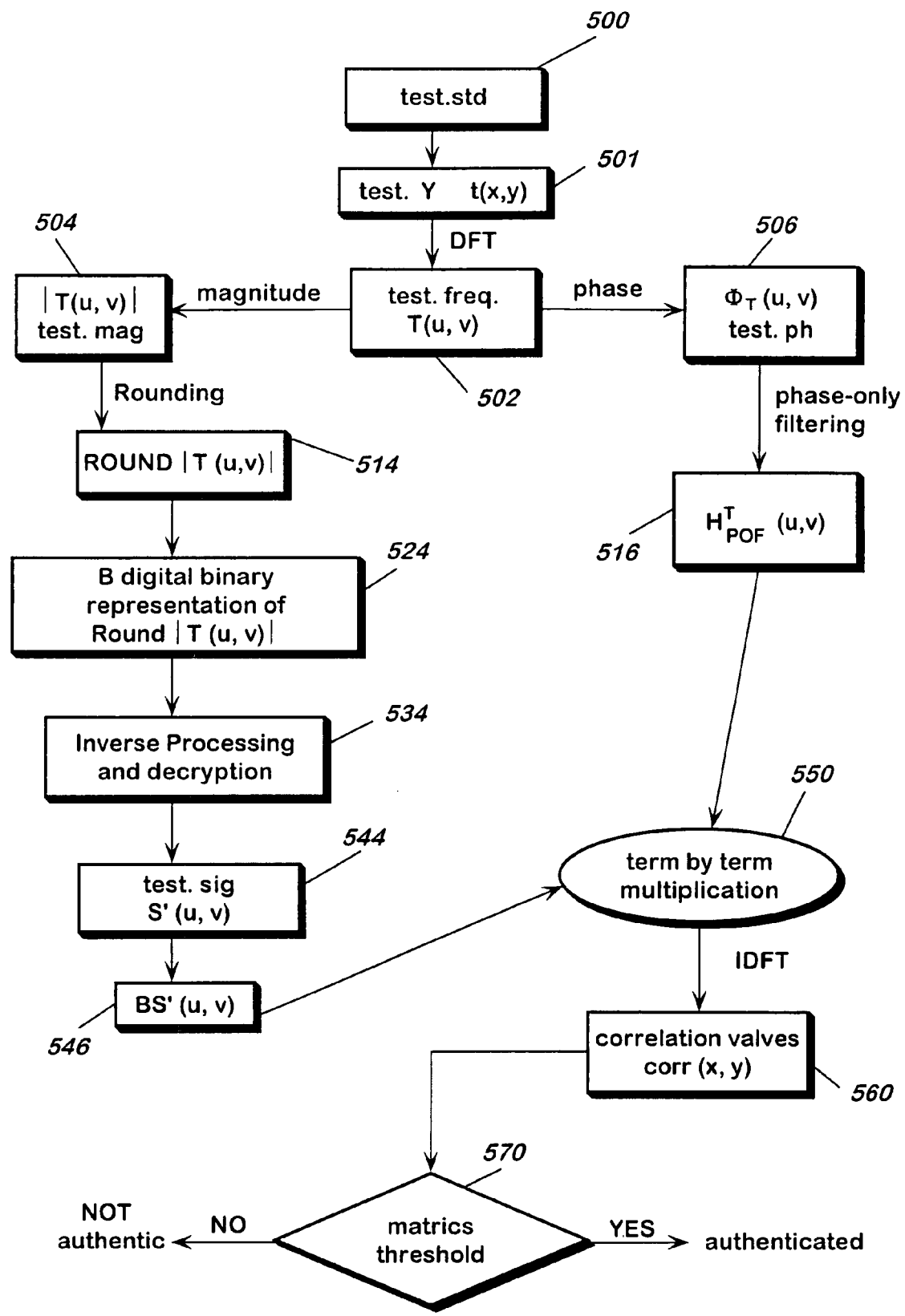
FIG. 5: The Watermark Extraction & Detection Process Flowchart

Extraction/Detection Process of the Present Invention:

The extraction/detection process is illustrated in FIG. 5. It includes the extraction of signature and a subsequent correlation operation for detection purposes. We start with a test image test.std (500) in the standard file format. We then calculate the Y values test.Y (501) as in the embedding process shown in FIG. 1. The (x,y) values are t(x,y). The discrete Fourier transform of this yields test.freq (502). The frequency (u,v) values are T(u,v). As in the embedding process test.freq (502) is decomposed into its magnitudes test.mag (504) and its phase values test.ph (506). That is if the (u,v) frequency of test.freq (502) is given as T(u,v), then the magnitude of T(u,v) is |T(u,v)| and the phase is $\phi_T$(u, v). Hence, T(u, v)=|T(u,v)| exp (j$\phi_T$(u, v)).

After a rounding operation on test.mag (504), we get the rounded magnitude of the test pattern Round |T(u,v)| (514). This can now be represented in a B-digit binary number (524). Then we perform the inverse processing and decryption (534) that undoes what has been done in the embedding processing (128) and in the encryption process (120). The decryption process therefore requires the cryptographic key, the same key that was used for the embedding. Specifically, the present invention takes the $w^{th}$ place of the rounded magnitudes (514) and decrypt them, this output of (534) is S'(u,v) (544) which is named test.sig. If test.std was a legitimate watermarked image, under our process, then test.sig (544) should be an actual extracted signature. Therefore (544) must be tested. However, due to clipping, clamping, rounding, and possibly compression effects (544) may not be a perfect extracted signature. However, (544) is in the wrong binary from to perform correlation type tests. We must first convert any value of S'(u,v) (544) that is 0 to −1, and leave the 1 values alone. This results in BS'(u,v) (546). From the phase information (506) of the test image, the phase only filter POF (516) is computed as $H_{POF}^T(u,v)$=exp(−j$\phi_T$(u,v))

The next step is the term by term multiplication (550) of the phase only filter POF (516) with BS'(u,v) (546) in the frequency domain. An inverse discrete Fourier transform is then applied to the multiplication result to get the correlation values Corr(x,y) (560). The correlation test of the present invention is highly discriminatory.

Corr(x, y)=IDFT($H_{POF}^T(u,v)$·BS'(u, v))

The term BS'(u,v) in the above equation has a Hermetian type symmetry and also so does $H_{POF}^T$(u,v) (516). Therefore the operand of the IDFT operator in the above equation has a Hermetian type symmetry. Consequently, the resulting correlation values should not have any imaginary components. However, due to numerical rounding and possible compression effects some slight imaginary terms may be introduced that are ignores. Highly discriminatory correlation peaks will be obtained if the image is watermarked. A threshold (570) obtained from the simulations can be employed to decide about the authenticity of the hidden signature. Other type correlation tests might also work, but to deal with the compression of JPEG we need a test that has some elasticity.

Alternate embodiments of the present invention may add additional information by encrypting that information into the signature. One method for doing this is by using exclusive or with the BPOF which can hide additional information during the embedding process as part of the watermark signal. The task of the detector would then be to also extract the additional information. Of course the inability to perfectly recover the signature can affect the additional information. Therefore error correcting coding should be used.

Experimental Results

As a measure of validation of our approach, we performed some simulations for image authentication application using some commonly used standard image set. Although our algorithm is equally applicable to color images, the results furnished are obtained from watermarking the intensity image only.

We measure authentication of a watermarked image by the degree of correlation of the extracted signature with the computed phase signature. Let $P_{max}$ and $P_{second}$ denote the highest and the second highest peaks of the correlation plane. Note that the second highest peak is usually calculated excluding a small (i.e., 3×3 to 7×7) pixel area centered on the highest peak. Let μ be the average value of the entire correlation plane. The first metric is the peak-to-average-correlation-energy (PACE) which is defined as the ratio of the highest correlation peak energy to that of the average correlation energy. This is a measure of relative sharpness of the peak. We calculate this ratio in db by expressing it as $$PACE = 20\ \log_{10}\left(\frac{P_{max}}{\mu}\right)$$

Next we calculate the peak-to-secondary-peak ratio (PSR), given by $$PSR = 20\ \log_{10}\left(\frac{P_{max}}{P_{second}}\right)$$

This is a measure of degree of false positive in a detection algorithm. A higher PSR value indicates it is less likely to have a false positive.

In the experiment, we employed the 512×512 images and the total number of bit-planes was 25. And the embedded bit-plane was selected to be 13.

Figure 6:
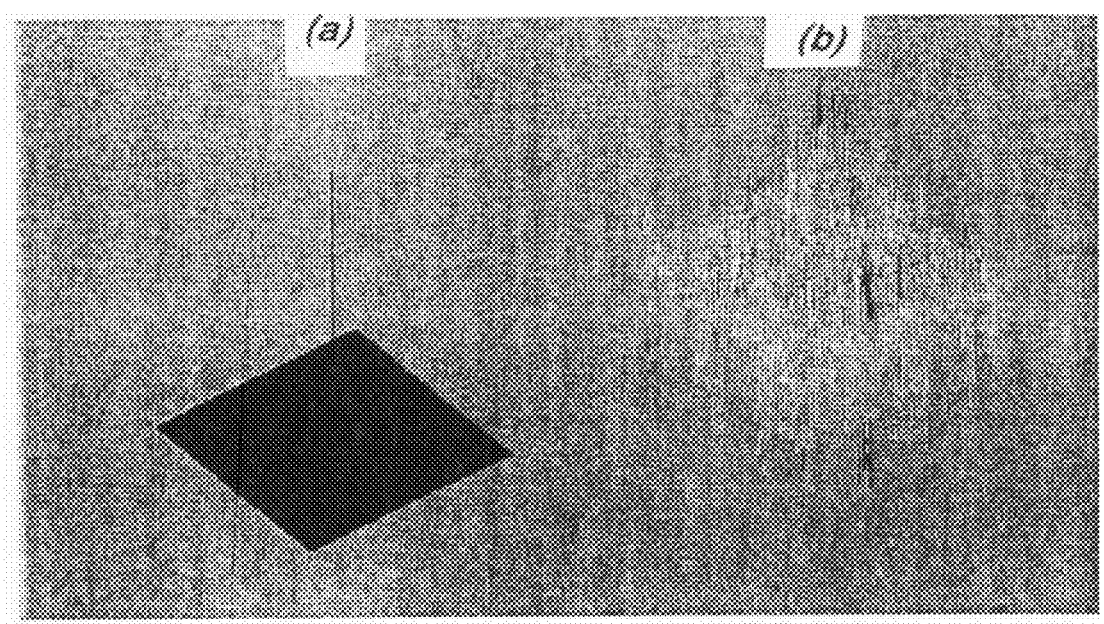
FIG. 6: Correlation Output for example (a) Watermarked Image, and (b) Unmarked Image

FIG. 6 shows[1] the correlation of the extracted signature and the POF of the test image. If the test image is a marked image we get nice peaky correlation as shown in FIG. 4(*a*). For an unmarked image, the peaks are all over and there is no sharp correlation peak as evident from FIG. 4(*b*).

[1] Of course we are now illustrating the correlation with the standard convenience of negative frequencies in order to put the "action" in the middle of the image.

Figure 7:
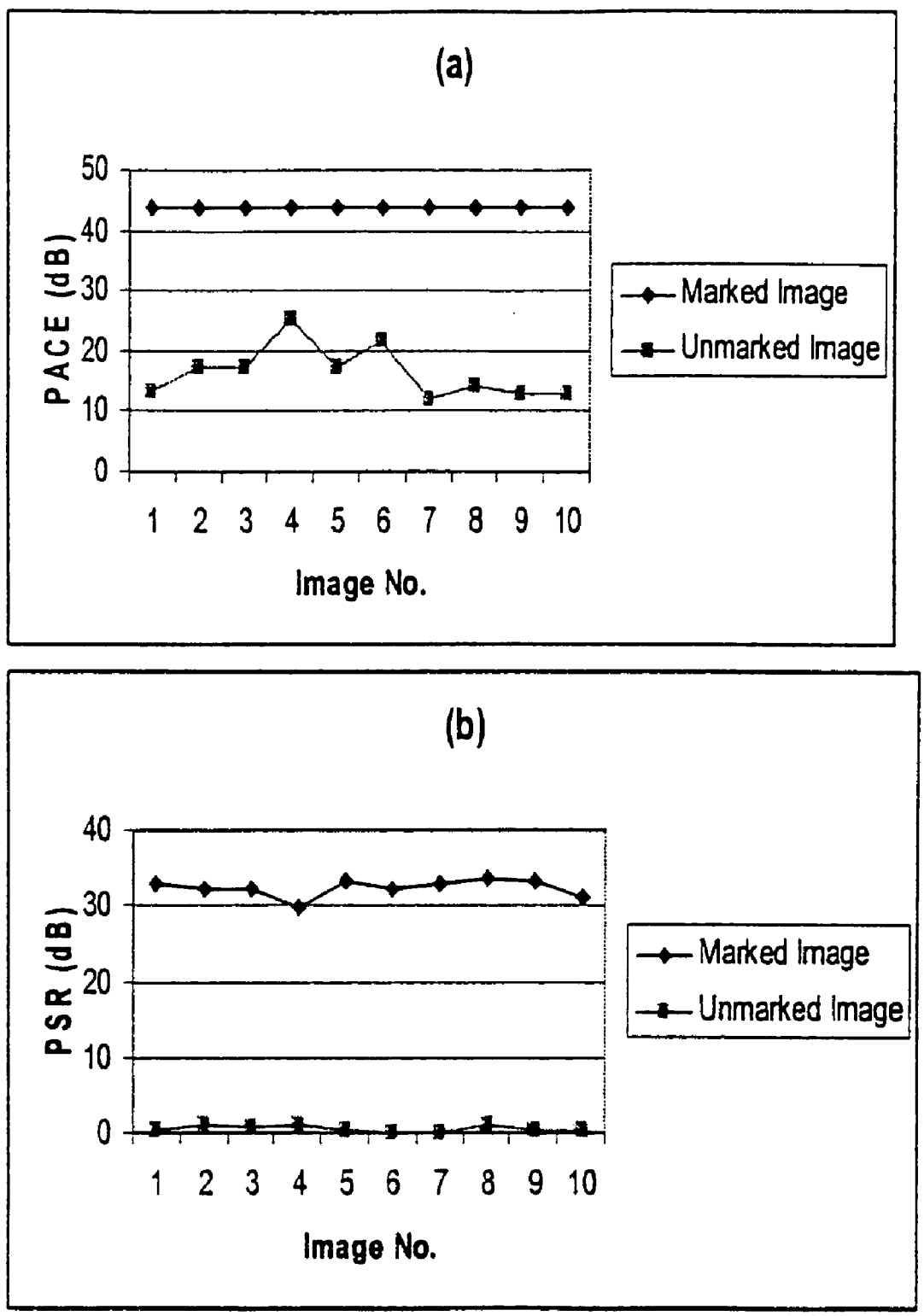
FIG. 7: Correlation Performance for the test image set a) PACE (peak-to-average-correlation-energy), b) PSR (peak-to-secondary-peak ratio)

FIG. 7(*a*) shows the PACE values for marked and unmarked images for all the 256×256 images in the experimental set. There is clear separation between them and it is obvious that we can set a threshold that will authenticate a marked image from an unmarked one.

FIG. 7(*b*) shows the similar result for PSR values. The separation is even more here which shows a highly unlikely false positive probability in the authentication test. Note that in calculating the second highest peak (needed to calculate PSR), we excluded a 3×3 pixel area centered on the highest peak.

As observed, a threshold can be selected for each of the metrics, such that the authentication decision can be made by comparing with the selected correlation threshold.

Figure 8:
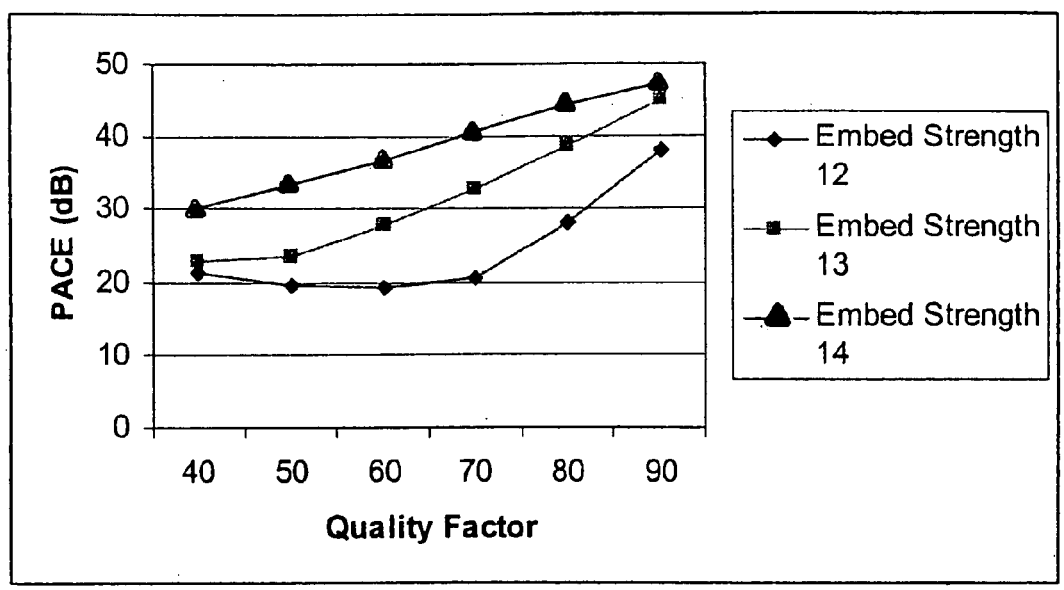
FIG. 8: Detector Performance vs Compression Quality Factor

With this we now look into the robustness of our algorithm. Simulation results have shown that the algorithm has some built-in robustness against JPEG compression, Gaussian filtering, image enhancement and cropping (to a certain degree). We here furnish the JPEG compression performance as this is one of the most frequently used desirable attacks the watermarked image may go through. FIG. 8 depicts the corresponding correlation output at different quality factors and different embedding strength. It is interesting to see that even at a quality factor of 40% (at embedding strength 13), the correlation metrics value is 22.9. The corresponding value for an unmarked case is 17.5. Hence the marked image can still be authenticated against the unmarked one. We can even tolerate a little more compression, if the embedding plane is adjusted to the $14^{th}$ bit plane as shown. For a smaller strength (12 bit plane for example), performance degrades slowly.

The experimental results show that the present invention is extremely useful for image distribution scenarios over the Internet and email. The correlation-based detector in the present invention demonstrates a robust authentication of a watermarked image from an unmarked one. The present invention is particularly attractive to applications where it is desirable to tolerate image compression. As shown, the addition of watermark is context-sensitive, to make it harder to remove.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A method for digitally watermarking digital image files, said method comprising:

embedding a digital watermark into a digital image file; and extracting the digital watermark from the digital image file, wherein said embedding comprises extracting magnitudes of Fourier frequencies from the digital image file, extracting phases of Fourier frequencies, encrypting a signature from the extracted phases, and reassembling the signature into the digital image file, and wherein said extracting comprises detecting the digital watermark to authenticate the digital image file.

2. The method of claim 1 wherein, said embedding further comprises:

converting the digital image file to pixel luminance values; and applying a discrete Fourier transform to the pixel luminance values to produce a digital data file in the frequency domain.

3. The method of claim 2, wherein said embedding further comprises applying a discrete Fourier transform to the digital data file to create a frequency representation of the digital image file.

4. The method of claim 2, wherein said embedding further comprises separating the digital data file into a magnitude data file and a phase data file.

5. The method of claim 3, wherein said embedding further comprises applying a binary phase filter to the frequency representation of the digital data file.

6. The method of claim 5, wherein said embedding further comprises:

assigning a pre-signature to the frequency representation of the digital data file; and encrypting the pre-signature into the signature.

7. The method of claim 2, wherein said embedding further comprises combining an encrypted signature with rounded magnitudes of the discrete Fourier transform to form modified magnitudes.

8. The method of claim 4, wherein said embedding further comprises forming a new frequency domain file by combining modified magnitudes of the discrete Fourier transform and the phase data file.

9. The method of claim 8, wherein said embedding further comprises applying an inverse discrete Fourier transform to the new frequency domain file giving new luminance values for the digital image file.

10. The method of claim 1, wherein said extracting further comprises:

converting the digital image file to pixel luminance values; and applying a discrete Fourier transform to the luminance values to produce a digital data file in the frequency domain.

11. The method of claim 10, wherein said extracting further comprises separating the digital data file into a magnitude data file and a phase data file.

* * * * *